(12) United States Patent
Wang

(10) Patent No.: US 10,185,173 B2
(45) Date of Patent: Jan. 22, 2019

(54) DISPLAY MODULE AND DISPLAY DEVICE HAVING A RAY-SCATTERING PRISM BETWEEN A TRANSFLECTIVE LAYER AND A REFLECTIVE MEMBER

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 686 days.

(21) Appl. No.: 14/525,646

(22) Filed: Oct. 28, 2014

(65) Prior Publication Data

US 2015/0362797 A1    Dec. 17, 2015

(30) Foreign Application Priority Data

Jun. 13, 2014 (CN) .......................... 2014 1 0265737

(51) Int. Cl.
*G02F 1/1335* (2006.01)
*G02B 5/02* (2006.01)
(Continued)

(52) U.S. Cl.
CPC ..... *G02F 1/133524* (2013.01); *G02B 5/0278* (2013.01); *G02B 5/0284* (2013.01);
(Continued)

(58) Field of Classification Search
CPC .. G02B 5/0242; G02B 5/0278; G02B 5/0284; G02B 5/0289; G02B 5/10;
(Continued)

(56) References Cited

U.S. PATENT DOCUMENTS

| | | | |
|---|---|---|---|
| 2007/0097296 A1* | 5/2007 | Li | G02B 6/0063 349/114 |
| 2014/0078778 A1* | 3/2014 | Moriwaki | G09F 9/3026 362/610 |

(Continued)

FOREIGN PATENT DOCUMENTS

| | | |
|---|---|---|
| CN | 101593473 A | 12/2009 |
| CN | 102854644 A | 1/2013 |

(Continued)

OTHER PUBLICATIONS

First Office Action regarding Chinese application No. 201410265737.6, dated Mar. 28, 2016. Translation provided by Dragon Intellectual Property Law Firm.

*Primary Examiner* — Stephone B Allen
*Assistant Examiner* — Ryan S Dunning
(74) *Attorney, Agent, or Firm* — Harness, Dickey & Pierce, P.L.C.

(57) ABSTRACT

The present disclosure provides a display module, including a display panel and a bezel. The display panel includes a central display region, a peripheral display region, a bezel region, a first optical member at least partially arranged above the peripheral display region, and a second optical member at least partially arranged above the bezel region. A part of rays emitted from the peripheral display region is reflected by the first optical member toward the second optical member, and emits upward from the bezel region after being reflected again by the second optical member.

19 Claims, 2 Drawing Sheets

(51) Int. Cl.
*G02B 17/06* (2006.01)
*G02B 27/10* (2006.01)
*G02F 1/1333* (2006.01)

(52) U.S. Cl.
CPC ....... *G02B 5/0289* (2013.01); *G02B 17/0621* (2013.01); *G02B 27/1066* (2013.01); *G02F 1/133308* (2013.01); *G02F 1/133504* (2013.01); *G02F 1/133555* (2013.01); *G02F 2001/13332* (2013.01); *G02F 2001/133562* (2013.01)

(58) Field of Classification Search
CPC .. G02B 17/0621; G02B 27/10; G02B 27/106; G02B 27/1066; G02B 27/144; G02B 27/145; G02F 1/133308; G02F 2001/13332; G02F 1/133328; G02F 1/13336; G02F 1/133504; G02F 1/133524; G02F 1/133555; G02F 2001/133557; G02F 2001/133562; G02F 1/133608; G02F 1/133615

USPC ............ 349/57, 58, 61, 62, 66, 73; 359/599, 359/615, 629, 638, 839, 857, 858, 859; 362/603, 632, 633, 634
See application file for complete search history.

(56) References Cited

U.S. PATENT DOCUMENTS

2014/0085569 A1* 3/2014 Choi ................. G02F 1/133606
349/64
2014/0168786 A1* 6/2014 Lee .................... G02B 27/1066
359/638

FOREIGN PATENT DOCUMENTS

| | | |
|---|---|---|
| CN | 103412424 A | 11/2013 |
| JP | 2009244409 A | 10/2009 |
| TW | 201314311 A | 4/2013 |

* cited by examiner

DISPLAY MODULE AND DISPLAY DEVICE HAVING A RAY-SCATTERING PRISM BETWEEN A TRANSFLECTIVE LAYER AND A REFLECTIVE MEMBER

CROSS-REFERENCE TO RELATED APPLICATION

This application claims a priority of the Chinese patent application No. 201410265737.6 filed on Jun. 13, 2014, which is incorporated herein by reference in its entirety.

FIELD OF THE INVENTION

The present disclosure relates to the field of display technology, in particular to a display module and a display device.

DESCRIPTION OF THE PRIOR ART

Along with the rapid development of liquid crystal display (LCD) panel, LCD has gradually become a mainstream of display technologies due to its features such as being ultrathin, light, free of radiation and stable in performance. Currently, most of the LCDs available in the market are of a backlight type, and each of them includes a liquid crystal display panel and a backlight module. The liquid crystal display panel is mounted and protected by a bezel of the backlight module. Along with the development and popularization of the LCD, there is an increasing demand in the market to narrow, and even eliminate, the bezel of the liquid crystal display panel. However, the bezel of the existing liquid crystal display panel cannot be eliminated. Hence, there is an urgent need to eliminate the bezel of the liquid crystal display panel.

SUMMARY OF THE INVENTION

An object of the present disclosure is to provide a display module and a display device, so as to attenuate or eliminate a bezel.

The technical solution provided in the present disclosure is as follows.

A display module includes a display panel and a bezel, the display panel including a central display region, a peripheral display region, and a bezel region where the bezel is arranged; wherein the display module further includes a light guide structure configured to deflect a part of rays emitted from the peripheral display region to cause the part of rays emitted from the peripheral display region to emit upward from the bezel region; wherein the light guide structure includes: a first optical member at least partially arranged above the peripheral display region of the display panel, the part of rays emitted from the peripheral display region of the display panel being reflected by the first optical member to travel upward the bezel region; and a second optical member at least partially arranged above the bezel region and configured to receive the rays reflected by the first optical member and reflect the received rays again to cause the received rays to emit upward from the bezel region.

Further, the first optical member is a transflective layer arranged above the peripheral display region; a reflective surface of the transflective layer faces the display panel.

Further, the transflective layer is a first curved-surface structure with a middle portion projecting toward a direction away from the second optical member; the first curved-surface structure is configured to scatter rays reflected by the transflective layer and transmit the scattered rays to the second optical member.

Further, the second optical member includes a reflective layer arranged at the bezel region; a reflective surface of the reflective layer faces the reflective surface of the transflective layer.

Further, the reflective layer is a second curved-surface structure with a middle portion projecting toward a direction away from the transflective layer; the second curved-surface structure is configured to scatter rays reflected by the reflective layer and transmit the scattered rays upward from the bezel region.

Further, the light guide structure further includes a scattering layer arranged between the first optical member and the second optical member; the scattering layer is configured to scatter the rays reflected by the first optical member and transmit the scattered rays to the second optical member, and/or configured to scatter the rays reflected by the second optical member and transmit the scattered rays upward from the bezel region.

Further, the light guide structure further includes a transmissive body; the first optical member, the second optical member and the scattering layer are arranged on the transmissive body and fixed onto the bezel through the transmissive body.

Further, the scattering layer is composed of scattering particles distributed within the transmissive body.

Further, the transmissive body is fixed onto the bezel by means of an optical adhesive.

Further, the second optical member is arranged closer to the scattering layer than the first optical member.

One embodiment of the present disclosure provides a display module, including a display panel, a bezel, a transmissive body, a first optical member and a second optical member; wherein the display panel includes a central display region, a peripheral display region and a bezel region; the bezel is arranged along a periphery of the display panel and covers the bezel region; the transmissive body is arranged on the bezel and extends along the bezel; the first optical member is arranged on the transmissive body and at least partially covers the peripheral display region; the second optical member is arranged on the transmissive body; wherein a part of rays emitted from the peripheral display region is reflected by the first optical member toward the second optical member, and emits upward from the bezel region after being reflected again by the second optical member.

Further, the first optical member and the second optical member are both arranged within the transmissive body.

Further, the first optical member includes a transflective layer arranged above the peripheral display region; a reflective surface of the transflective layer faces the display panel.

Further, the transflective layer includes a plurality of transflective membranes each having a curved shape, and the transflective membranes each having a curved shape are spaced apart from each other.

Further, the transflective layer is a transflective membrane having multiple curved surfaces.

Further, the second optical member includes a reflective layer arranged above the bezel region; a reflective surface of the reflective layer faces the reflective surface of the transflective layer.

Further, the display module further includes a scattering layer arranged between the first optical member and the second optical member.

Further, the scattering layer includes scattering particles distributed within the transmissive body.

Further, the peripheral display region is between the first optical member and an inner edge of the bezel.

One embodiment of the present disclosure provides a display device including the above-mentioned display module.

The present disclosure has the following advantageous effects. According to the display module of the present disclosure, the light guide structure, such as the first optical member and the second optical member, is arranged on the bezel, and a part of the rays emitted from the peripheral display region of the display panel may be deflected by the light guide structure and then emit upward from the bezel. As a result, an optical effect of attenuating or eliminating the bezel may be achieved.

Further, in an exemplary embodiment of the present disclosure, the other part of the rays emitted from the peripheral display region of the display panel may directly emit upward from the peripheral display region. As a result, the peripheral display region of the display panel may still normally display.

DETAILED DESCRIPTION OF THE PREFERRED EMBODIMENTS

Principles and features of the present disclosure will be described hereinafter in conjunction with the drawings. The following embodiments are for illustrative purposes only, but shall not be used to limit the scope of the present disclosure.

Figure 1:
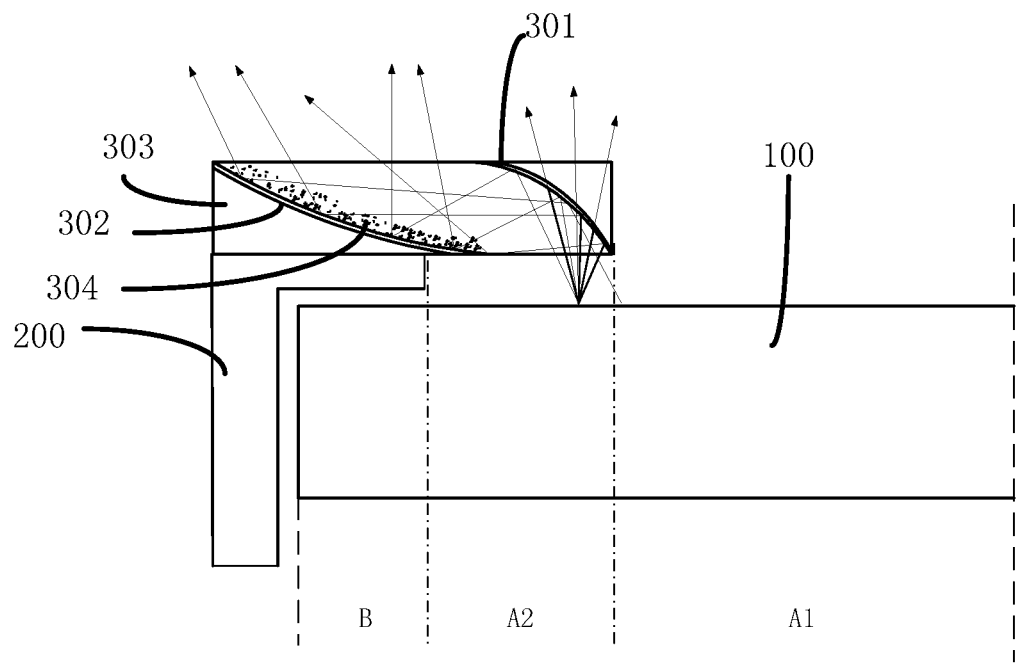
FIG. 1 is a schematic view showing a display module according to a first embodiment of the present disclosure.

As shown in FIG. 1, a display module provided in one embodiment of the present disclosure includes:
a display panel 100 which includes a central display region A1, a peripheral display region A2 and a bezel region B, a peripheral portion of the central display region A1 being the peripheral display region A2, and a region of the display panel 100 which cannot display images being the bezel region B;
a bezel 200 arranged at the bezel region B; and
a light guide structure configured to deflect a part of rays emitted from the peripheral display region A2 to cause the part of the rays to emit upward from the bezel region B.

The light guide structure includes:
a first optical member at least partially arranged above the peripheral display region A2 of the display panel 100, the part of rays emitted from the peripheral display region A2 of the display panel 100 being reflected by the first optical member to travel upward the bezel region B; and
a second optical member at least partially arranged above the bezel region B and configured to receive the rays reflected by the first optical member and reflecting the received rays again to cause the received rays to emit upward from the bezel region B.

As mentioned above, the light guide structure is arranged above the bezel 200, and a part of the rays emitted from the peripheral display region A2 of the display panel 100 is reflected by the light guide structure and then emitted upward from the bezel 200. When the rays emitted upward from the bezel 200 are viewed by a viewer, an optical effect of attenuating or eliminating the bezel 200 may be achieved.

Optionally, as shown in FIG. 1, the first optical member includes a transflective layer 301 arranged above the peripheral display region A2 (when the display module is located at a position shown in FIG. 1). A reflective surface of the transflective layer 301 faces the display panel 100, and defines an angle with respect to the display panel 100.

Adopting the above solution, the transflective layer 301 is a layer through which incident rays may be partially transmitted and by which the incident rays may be partially reflected. The transflective layer 301 is arranged above the peripheral display region A2 of the display panel 100, so a part of the rays emitted from the peripheral display region A2 of the display panel 100 may be transmitted through the transflective layer 301 and then directly emit upward from the peripheral display region A2 of the display panel 100, while the other part of the rays may be reflected by the transflective layer 301. Further, since the reflective surface of the transflective layer 301 faces the display panel 100 and defines an angle with respect the display panel 100, thus, the other part of the rays may be reflected to the second optical member arranged above the bezel 200.

It should be appreciated that, in actual applications, the first optical member may also be any other optical member, as long as the incident rays may be partially transmitted and partially reflected and the reflected rays are transmitted upward the bezel 200. For example, the first optical member may be a prism structure. The prism structure may include a plurality of transmissive regions through which rays may be transmitted and a plurality of reflective regions by which the rays may be reflected. The transmissive regions and the reflective regions are alternatively arranged. Other possible modes of the first optical member are not listed here one by one.

Optionally, as shown in FIG. 1, the transflective layer 301 is a first curved-surface structure with a middle portion projecting toward a direction away from the second optical member or the bezel 200, so as to scatter the rays reflected by the transflective layer 301 and transmit the scattered rays to the second optical member. Adopting the above technical solution, the rays reflected by the transflective layer 301 are scattered and transmitted to the second optical member, so that emergence angles of the rays emitted upward from the bezel 200 are more scattered, thereby improving the uniformity of the rays emitted upward from the bezel 200.

It should be appreciated that, surface curvature of the transflective layer 301 may be adjusted in accordance with actual needs, and the structure of the transflective layer 301 may not be limited to the above.

Figure 2:
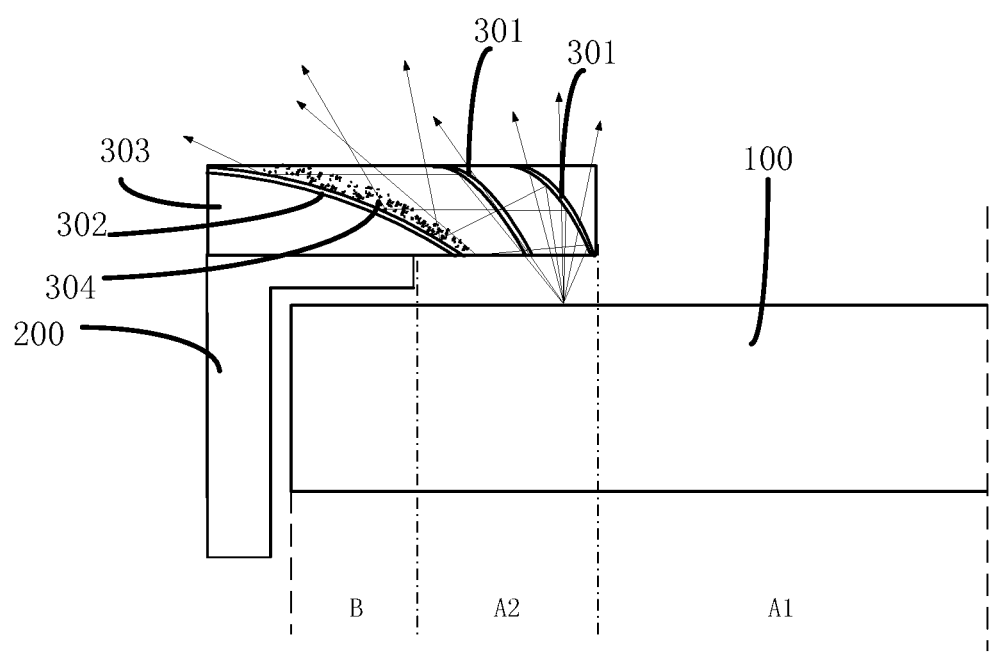
FIG. 2 is a schematic view showing a display module according to a second embodiment of the present disclosure.

For example, as shown in FIG. 2 which is a schematic view showing the display module according to another embodiment of the present disclosure, the transflective layer 301 may be a structure of multiple curved surfaces, i.e., the transflective layer 301 may be composed of a plurality of transflective membranes each having a curved shape, or the transflective layer 301 may be a transflective membrane with multiple curved surfaces. Adopting the above structures, the transflective layer 301 may improve the uniformity of the rays. The transflective layer 301 may also be a flat, slant-surface structure, which will not be listed here one by one.

It should be further appreciated that, in actual applications, a beam-expanding prism may be arranged between the first optical member and the second optical member, so as to scatter the rays incident on the second optical member in a better manner.

Optionally, as shown in FIG. 1, the second optical member includes a reflective layer 302 arranged above the bezel region B (when the display module is located at a position shown in FIG. 1). A reflective surface of the reflective layer 302 faces the reflective surface of the transflective layer 301.

Adopting the above technical solution, the second optical member includes the reflective layer 302 and the reflective surface of reflective layer 302 faces the reflective surface of the transflective layer 301. As a result, the second optical member is able to deflect the rays reflected by the transflective layer 301 to cause the rays reflected by the transflective layer 301 to emit upward from the bezel 200. It should be appreciated that, in actual applications, the structure of the second optical member is not limited to the above, and any other optical member, e.g., a prism structure capable of reflecting the rays, may also be adopted.

Optionally, as shown in FIG. 1, the reflective layer 302 is a second curved-surface structure with a middle portion projecting toward a direction away from the transflective layer 301 or towards the bezel 200, so as to scatter the rays reflected by the reflective layer 302 and transmit the scattered rays upward from the bezel region B. Adopting the above technical solution, the rays reflected by the reflective layer 302 are scattered and transmitted upward from the bezel 200 at scattered emergence angles, thereby further improving the uniformity of the rays emitted upward from the bezel 200.

Figure 3:
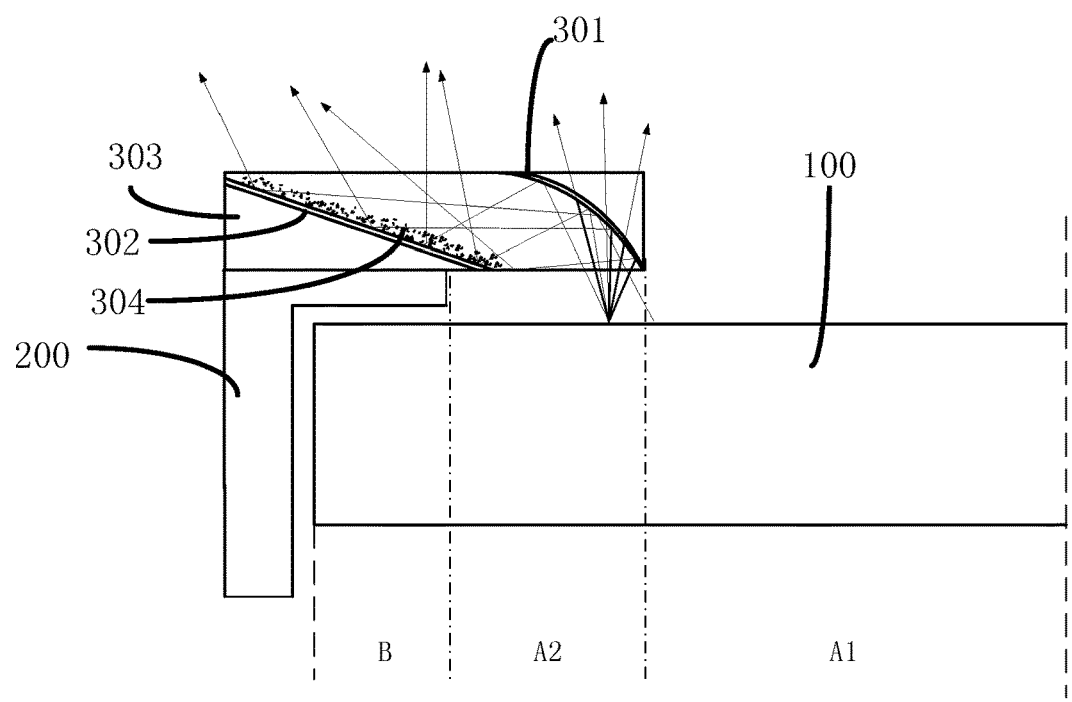
FIG. 3 is a schematic view showing a display module according to a third embodiment of the present disclosure.
Figure 4:
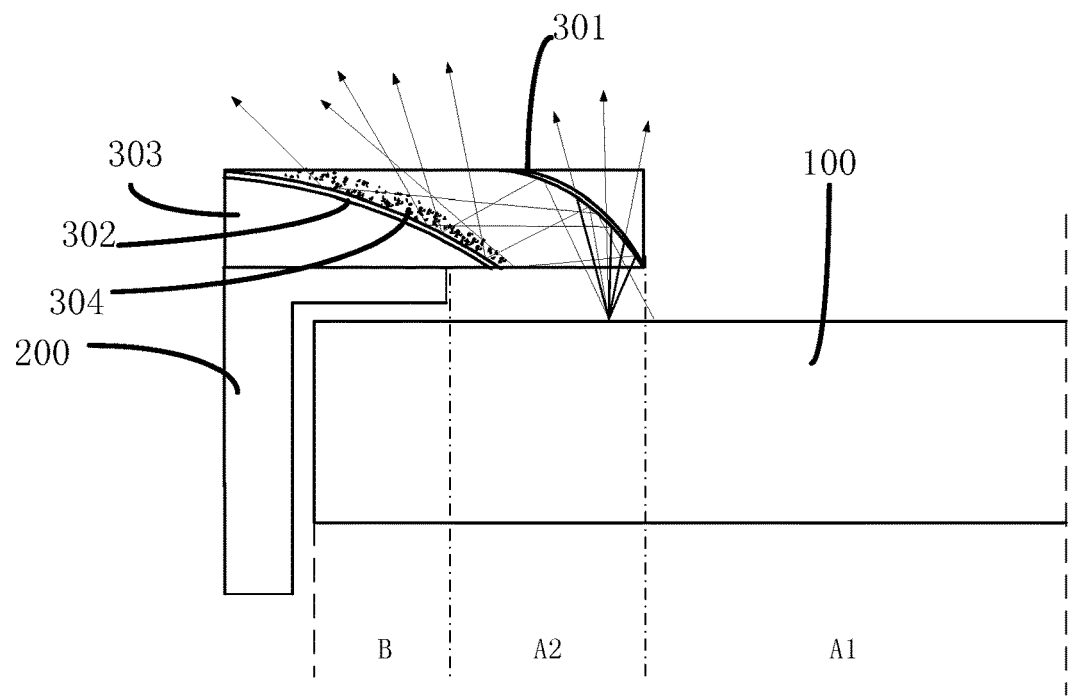
FIG. 4 is a schematic view showing a display module according to a fourth embodiment of the present disclosure.

It should be appreciated that, surface curvature of the reflective layer 302 may be adjusted in accordance with actual needs, and the structure thereof may not be limited to the above. For example, as shown in FIG. 3 which is a schematic view showing a display module according to yet another embodiment of the present disclosure, the reflective layer 302 may be a flat, slant-surface structure, or as shown in FIG. 4 which is a schematic view showing a display module according to still yet another embodiment of the present disclosure, the reflective layer 302 may be a third curved-surface structure with a middle portion projecting toward a direction close to the transflective layer 301. Other structures of the reflective layer 302 will not be listed here one by one.

In addition, it should be further appreciated that, when the reflective layer 302 is of the second curved-surface structure, a reflection direction of the rays may be more accurate and the reflection direction of the rays may be adjusted in a more flexible manner as compared with the flat, slant-surface structure or the third curved-surface structure. As a result, such a reflective layer 302 is adapted to the elimination of the bezel of a screen which has a fixed viewing angle and a fixed viewing position.

When the reflective layer 302 is of the third curved-surface structure, the rays may be reflected at a wider angle as compared with the flat, slant-surface structure or the second curved-surface structure. As a result, such a reflective layer 302 is adapted to the elimination of the bezel of a screen which has a wider viewing angle.

In addition, when the reflective layer 302 is of a flat, slant-surface structure, its capability of reflecting the rays is just between that of the second curved-surface structured and that of the third curved-surface structure, and such a reflective layer 302 may be manufactured more easily.

It should be further appreciated that, in actual applications, a beam-expanding prism may be arranged in an emission direction of the rays reflected by the second optical member, so that emergence angles of the rays emitted upward from the bezel 200 may be more scattered.

Optionally, as shown in FIG. 1, the light guide structure further includes a scattering layer 304 arranged between the first optical member and the second optical member. The scattering layer 304 is configured to scatter the rays reflected by the first optical member and transmit the scattered rays to the second optical member, and/or the scattering layer 304 is configured to scatter the rays reflected by the second optical member and transmit the scattered rays upward from the bezel region B. Here, the scattering layer 304 is used to scatter the rays, thereby improving the uniformity of the rays emitted upward from the bezel 200.

Optionally, as shown in FIG. 1, the light guide structure further includes a transmissive body 303. The first optical member, the second optical member and the scattering layer 304 are all arranged on the transmissive body 303 and fixed onto the bezel 200 through the transmissive body 303. The transflective layer 301, the reflective layer 302 and the scattering layer 304 may be arranged within the transmissive body 303 and fixed at corresponding positions above the bezel 200 through the transmissive body 3003, respectively. The transmissive body 303 may be made of a high-transmittance resin material, such as polymethyl methacrylate (PMMA), polycarbonate (PC), and polyethylene terephthalate (PET), or optical glass with a low refractive index. Optionally, the scattering layer 304 is composed of scattering particles distributed within the transmissive body 303.

It should be appreciated that, in actual applications, the transflective layer 301, the reflective layer 302 and the scattering layer 304 may be arranged at the corresponding positions above the bezel 200 in any other ways.

Optionally, the transmissive body 303 is fixed onto the bezel 200 by means of an optical adhesive. Of course, the fixation way of the transmissive body 303 is not particularly defined herein.

It should be further appreciated that, in the display module of the present disclosure, the light guide structure is used to achieve an optical effect of attenuating or eliminating the bezel 200. The brightness of the rays in the peripheral display region A2 of the display panel 100 may be enhanced, so as to provide the first optical member with sufficient light energy for the reflection and transmission, thereby further ensuring a display effect of the entire display module.

The present disclosure further provides a display device including the above-mentioned display module.

The foregoings are merely exemplary embodiments of the present disclosure. It should be appreciated that, a person skilled in the art may make further modifications and improvements, without departing from the principle of the present disclosure, and these modifications and improvements shall also fall within the scope of the present disclosure.

What is claimed is:

1. A display module, comprising a display panel and a bezel, the display panel comprising a central display region, a peripheral display region, and a bezel region where the bezel is arranged;

wherein the display module further comprises a light guide structure configured to deflect a part of rays emitted from the peripheral display region to cause the part of rays emitted from the peripheral display region to emit upward from the bezel region so that rays emitted from the peripheral display region and the bezel region correspond to an identical image;

wherein the light guide structure comprises:

a first optical member at least partially arranged above the peripheral display region of the display panel, the part of rays emitted from the peripheral display region of the display panel being reflected by the first optical member to travel towards the bezel region, wherein the first optical member is a transflective layer arranged above the peripheral display region, and a reflective surface of the transflective layer faces the display panel; and a second optical member at least partially arranged above the bezel region and configured to receive rays reflected by the first optical member and reflect the received rays again to cause the received rays to emit upward from the bezel region, wherein when an incident ray is incident on a point of the transflective layer, a part of the incident ray is transmitted, and the other part of the incident ray is reflected, wherein the light guide structure further comprises a beam-expanding prism arranged between the first optical member and the second optical member, and the beam-expanding prism is configured to scatter the rays from the first optical member and incident on the second optical member.

2. The display module according to claim 1, wherein the transflective layer has a first curved-surface structure with a middle portion projecting toward a direction away from the second optical member; the first curved-surface structure is configured to scatter the rays reflected by the transflective layer and transmit the scattered rays to the second optical member.

3. The display module according to claim 1, wherein the second optical member comprises a reflective layer arranged at the bezel region; a reflective surface of the reflective layer faces the reflective surface of the transflective layer.

4. The display module according to claim 3, wherein the reflective layer has a second curved-surface structure with a middle portion projecting toward a direction away from the transflective layer; the second curved-surface structure is configured to scatter rays reflected by the reflective layer and transmit the scattered rays upward from the bezel region.

5. The display module according to claim 1, wherein the light guide structure further comprises a scattering layer arranged between the first optical member and the second optical member; the scattering layer is configured to scatter rays reflected by the first optical member and transmit the scattered rays to the second optical member, and/or configured to scatter rays reflected by the second optical member and transmit the scattered rays upward from the bezel region.

6. The display module according to claim 5, wherein the light guide structure further comprises a transmissive body; the first optical member, the second optical member and the scattering layer are arranged on the transmissive body and fixed onto the bezel through the transmissive body.

7. The display module according to claim 6, wherein the scattering layer is composed of scattering particles distributed within the transmissive body.

8. The display module according to claim 6, wherein the transmissive body is fixed onto the bezel by means of an optical adhesive.

9. The display module according to claim 5, wherein the second optical member is arranged closer to the scattering layer than the first optical member.

10. A display module comprising a display panel, a bezel, a transmissive body, a first optical member and a second optical member;

wherein the display panel comprises a central display region, a peripheral display region and a bezel region;

the bezel is arranged along a periphery of the display panel and covers the bezel region;

the transmissive body is arranged on the bezel and extends along the bezel;

the first optical member is arranged on the transmissive body and at least partially covers the peripheral display region;

the second optical member is arranged on the transmissive body; wherein a part of rays emitted from the peripheral display region is reflected by the first optical member toward the second optical member, and emits upward from the bezel region after being reflected again by the second optical member so that rays emitted from the peripheral display region and the bezel region correspond to an identical image, and wherein the first optical member comprises a transflective layer arranged above the peripheral display region; a reflective surface of the transflective layer faces the display panel, and when an incident ray is incident on a point of the transflective layer, a part of the incident ray is transmitted, and the other part of the incident ray is reflected, wherein the light guide structure further comprises a beam-expanding prism arranged between the first optical member and the second optical member, and the beam-expanding prism is configured to scatter the rays from the first optical member and incident on the second optical member.

11. The display module according to claim 10, wherein the first optical member and the second optical member are both arranged within the transmissive body.

12. The display module according to claim 10, wherein the transflective layer comprises a plurality of transflective membranes each having a curved shape, and the transflective membranes each having a curved shape are spaced apart from each other.

13. The display module according to claim 10, wherein the transflective layer is a transflective membrane having a plurality of curved surfaces.

14. The display module according to claim 10, wherein the second optical member comprises a reflective layer arranged above the bezel region; a reflective surface of the reflective layer faces the reflective surface of the transflective layer.

15. The display module according to claim 11, further comprising a scattering layer arranged between the first optical member and the second optical member.

16. The display module according to claim 15, wherein the scattering layer comprises scattering particles distributed within the transmissive body.

17. The display module according to claim 10, wherein the peripheral display region is between the first optical member and an inner edge of the bezel.

18. A display device comprising the display module according to claim 1.

19. The display module according to claim 1, wherein the transflective layer and the reflective layer are arranged inside a transmissive body, and the transmissive body is made of a resin material with a high transmittance.

* * * * *